(12) United States Patent
Liao et al.

(10) Patent No.: US 11,461,267 B2
(45) Date of Patent: Oct. 4, 2022

(54) METHOD, DEVICE AND COMPUTER READABLE MEDIUM FOR ACCESSING FILES

(71) Applicant: EMC IP Holding Company LLC, Hopkinton, MA (US)

(72) Inventors: Lanjun Liao, Chengdu (CN); Qingxiao Zheng, Chengdu (CN); Yi Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 715 days.

(21) Appl. No.: 16/288,043

(22) Filed: Feb. 27, 2019

(65) Prior Publication Data
US 2020/0133916 A1 Apr. 30, 2020

(30) Foreign Application Priority Data
Oct. 26, 2018 (CN) .......................... 201811267031.8

(51) Int. Cl.
| | | |
|---|---|---|
| *G06F 16/30* | (2019.01) | |
| *G06F 16/11* | (2019.01) | |
| *G06F 16/172* | (2019.01) | |
| *G06F 16/188* | (2019.01) | |

(52) U.S. Cl.
CPC .......... *G06F 16/122* (2019.01); *G06F 16/172* (2019.01); *G06F 16/188* (2019.01)

(58) Field of Classification Search
CPC ............. G06F 11/0727; G06F 11/0751; G06F 11/1446; G06F 16/122; G06F 16/172; G06F 16/188
See application file for complete search history.

(56) References Cited

U.S. PATENT DOCUMENTS

| | | | |
|---|---|---|---|
| 2004/0133577 A1* | 7/2004 | Miloushev | H04W 4/027 |
| 2007/0203877 A1* | 8/2007 | Qu | G06F 16/172 |
| 2016/0246816 A1* | 8/2016 | Abiri | G06F 16/148 |
| 2018/0052867 A1* | 2/2018 | Seiden | G06F 16/188 |
| 2018/0314844 A1* | 11/2018 | Testerman | G06F 21/6236 |

\* cited by examiner

*Primary Examiner* — Mahesh H Dwivedi
(74) *Attorney, Agent, or Firm* — Womble Bond Dickinson (US) LLP (57) ABSTRACT

Embodiments of the present disclosure provide a method, device and computer readable medium for accessing a file. The method described herein comprises: receiving, in a virtual file system on a client, a request for opening a file in the virtual file system from an application, the request comprising a path for the file; determining whether the file has been opened successfully at the client; in response to determining that the file fails to be opened at the client, searching a first cache of the virtual file system for the path, the first cache being configured to store paths for files that fail to be opened at the client; and in response to success in finding the path in the first cache, returning an indication of failure in opening the file to the application.

18 Claims, 5 Drawing Sheets

METHOD, DEVICE AND COMPUTER READABLE MEDIUM FOR ACCESSING FILES

CROSS-REFERENCE TO RELATED APPLICATION

This patent application claims priority, under 35 U.S.C. § 119, of Chinese Patent Application No. 201811267031.8, filed Oct. 26, 2018, entitled "METHOD, DEVICE AND COMPUTER READABLE MEDIUM FOR ACCESSING FILES."

FIELD

Embodiments of the present disclosure generally relate to file access, and more specifically, to a method, device and computer readable medium for accessing files.

BACKGROUND

Data backup refers to backing up data to a storage device of a server, such that data can be recovered through the backup when a data failure or disaster occurs, thereby avoiding unnecessary loss. The data recovery can include file level recovery, granular level recovery (GLR), and the like.

The GLR supports partial data in a backup, rather than the whole backup. In the GLR procedure, in response to a data recovery request from a user, a client maps a backup in a storage device of a backup server to a virtual partition of the client, such that the whole backup can be presented in a virtual file system (VFS). The user can select a part of data items from the whole backup for recovery. During the GLR period, not only data recovery application but also other processes on the client access the virtual partition. Therefore, the VFS performance is of vital importance to the GLR.

SUMMARY

The embodiments of the present disclosure provide a method, device and computer readable medium for accessing a file.

In a first aspect of the present disclosure, there is provided a method of accessing a file. The method comprises: receiving, in a virtual file system on a client, a request for opening a file in the virtual file system from an application, the request comprising a path for the file; determining whether the file has been opened successfully at the client; in response to determining that the file fails to be opened at the client, searching a first cache of the virtual file system for the path, the first cache being configured to store paths for files that fail to be opened at the client; and in response to success in finding the path in the first cache, returning an indication of failure in opening the file to the application.

In some embodiments, the method further comprises: in response to failure in finding the path in the first cache, transmitting a request for searching the file to a backup server; in response to receiving an indication of failure in finding the file from the backup server, storing the path for the file in the first cache; and returning the indication of the failure in opening the file to the application.

In some embodiments, the method further comprises: storing, in the first cache, time at which the file fails to be opened at the client.

In some embodiments, the method further comprises: in response to success in finding the path for the file in the first cache, updating the time for the file.

In some embodiments, storing the path in the first cache comprises: comparing the number of the paths for the files in the first cache with a threshold number; in response to the number of the paths exceeding the threshold number, determining a path for a first file that is least recently used in the files in the first cache; and removing the determined path for the first file from the first cache.

In some embodiments, determining whether the file has been opened successfully at the client comprises: searching a second cache of the virtual file system for the path, the second cache being configured to store paths for files that have been opened successfully at the client; and in response to failure in finding the path for the file in the second cache, determining that the file fails to be opened.

In a second aspect of the present disclosure, there is provided an electronic device. The electronic device comprises at least one processor, and at least one memory comprising computer program instructions. The at least one processor and the computer program instructions are configured, together with the at least one processor, to cause the electronic device to perform steps of the method according to the first aspect.

In a third aspect of the present disclosure, there is provided a computer readable medium. The computer readable medium is tangibly stored on a non-transient computer readable medium and comprises machine executable instructions. The machine executable instructions, when executed, cause a machine to perform steps of the method according to the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features and advantages of the present disclosure will become more apparent, through the following detailed description on the example embodiments of the present disclosure with reference to the accompanying drawings, in which the same reference symbols generally refer to the same elements.

DETAILED DESCRIPTION OF EMBODIMENTS

Preferred embodiments of the present disclosure will now be described in detail with reference to the accompanying drawings. Although the drawings illustrate preferred embodiments of the present disclosure, it would be appreciated that the present disclosure may be implemented in various manners but cannot be construed as being limited by the embodiments illustrated herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one embodiment" and "the embodiment" are to be read as "at least one embodiment." The term "another embodiment" is to be read as "at least another embodiment." The terms "first," "second," and the like may refer to different or the same objects. Other definitions, either explicit or implicit, may be included below.

As described above, GLR supports recovery of partial data in a backup, rather than the whole backup. For example, the VMware granular recovery allows individual files therein to be restored based on the whole virtual disk (VMDK) backup. In the VMware granular recovery, a client maps a VMDK backup in a storage device of a backup server to a virtual partition on the client, such that the whole VMDK backup can be presented in VFS on the client. A data recovery application on the client can call a VMware software development kit (SDK), to restore individual files therein based on the VMDK backup.

During GLR, not only the data recovery application but also other processes on the client access the virtual partition. For example, after detecting the virtual partition, the Windows operating system checks the drive letter and the icon of the virtual partition. In addition, after detecting the virtual partition, a back-stage file system management program automatically attempts to open a configuration file in some folders. When the back-stage file system management program attempts to open the configuration file, it is required to establish a connection between the client and the backup server to search the backup server for the configuration file, because the configuration file is not stored locally at the client. For another example, a system component accesses some particular files and folders by default. Since these folders and files are not necessary for data protection for a user, these folders and files are excluded during data backup and not backed up.

In the above scenario, the files attempted to be opened are not stored locally at the client, and the applications are trying continuously to open these files. At the client side, VFS acts as a middle layer, which is unable to control upper applications and an SDK behavior of the applications. It costs a large amount of time and resources for VFS to search these files that do not exist through the backup server and obtain ultimately a result of failure in opening the files. A low VFS performance may hang the whole input/output (I/O) request of a user operating system. At the backup server side, the backup server squanders I/O, the central processor (CPU) and network resources to search repeatedly invalid files. As compared to a local file system of a backup server, the VFS spends more resources of the backup server to search the files, in particular when the files are not presented on the backup server. It significantly decelerates the GLR procedure to search these files that do not exist through the backup server at the cost of a lot of time. The GLR time is related to a Recovery Time Objective (RTO), and RTO is one of the most important parameters of a disaster recovery system. Hence, the VFS performance is of vital importance to GLR.

According to embodiments of the present disclosure, there is provided a file access solution. In the solution, cache is provided in VFS of a client to store paths for files that fail to be opened. Upon receiving a request for opening the file from an application, the VFS searches a path for the file in the cache. If the path for the file is obtained in the cache, an indication of failure in opening the file is directly returned to the application, without a need of establishing a connection with the backup server to perform searching on the backup server. As a result, it saves time for establishing network communications between the client and the backup server and time for searching the backup server for the file.

The embodiments of the present disclosure will be described below in detail with reference to the accompanying drawings.

Figure 1:
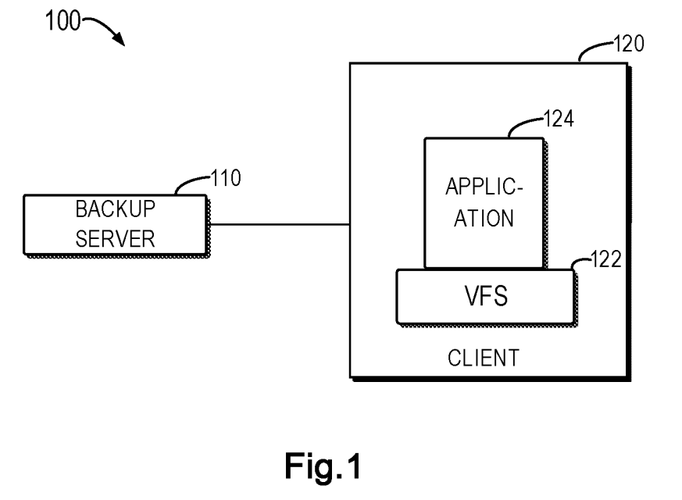
FIG. 1 illustrates a diagram of an example data protection system in which a plurality of embodiments of the present disclosure can be implemented.

FIG. 1 illustrates an example data protection system 100 in which a plurality of embodiments of the present disclosure can be implemented. It will be appreciated that the data protection system 100 as shown in FIG. 1 is provided merely as an example, without implying any limitation to the scope disclosed herein. The embodiments of the present disclosure can be embodied in various structures.

As shown in FIG. 1, the data protection system 100 includes a backup server 110 and a client 120. The backup server 110 is configured to store a backup of data. The client 120 is configured to be a proxy of the backup server 110 to implement data backup and recovery. In some embodiments, the backup server 110 can perform a backup operation for data via the client 120 regularly or in a specified interval, and store the backup in the backup server 110 for subsequent recovery. For brevity, FIG. 1 only illustrates a client 120, but it would be appreciated that there may be a plurality of clients acting as proxies of the backup server 110 to implement backup and recovery of different data.

A VFS 122 is created on the client 120. An application 124 may be run on the VFS 122. In some embodiments, the VFS 122 can be created on the client 120 in the process of performing GLR. To be specific, in response to a data recovery request from a user, the client 120 maps a backup in the storage device (not shown) of the backup server 110 to a virtual partition of the client 120, and the VFS 122 is created on the virtual partition. As such, the whole backup can be presented in the VFS 122. The user can select a part of data items from the whole backup for recovery. In some embodiments, the application 124 may be a data recovery application or an application that is different from the data recovery application. For example, the application 124 may be a back-stage file system management application of an operating system on the client 120, a Windows Explorer application, third-party SDK or the like.

During GLR, not only the data recovery application but also other processes on the client 120 access the above virtual partition. Therefore, the performance of the VFS 122 created on the virtual partition is of vital importance to GLR.

Figure 2:
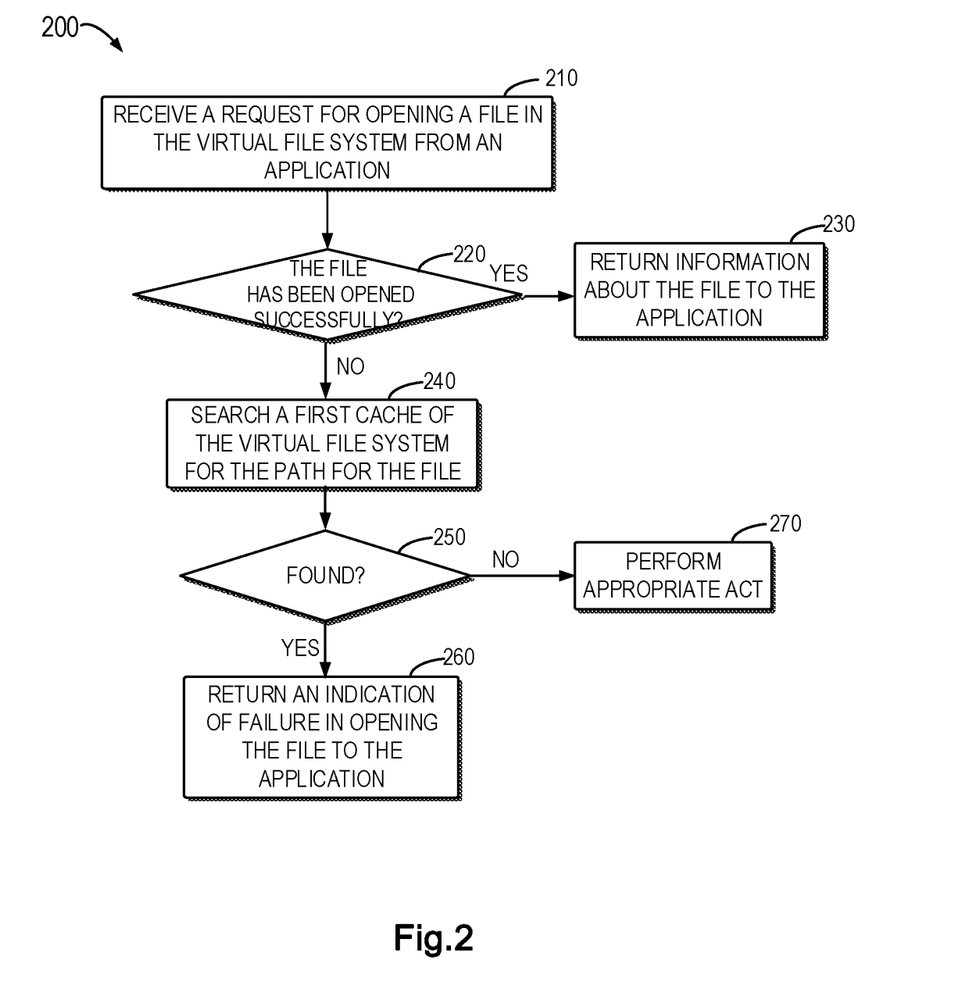
FIG. 2 illustrates a flowchart of a method of accessing a file according to some embodiments of the present disclosure.

FIG. 2 illustrates a flowchart of a method 200 of accessing a file according to some embodiments of the present disclosure. For example, the method 200 may be performed by the client 120. It would be appreciated that the method 200 may further include additional steps not shown and/or may skip the steps as shown, and the scope of the present disclosure is not limited. For convenience of discussion, the method 200 will be discussed with reference to FIG. 1.

At 210, the VFS 122 receives, from the application 124, a request for opening a file in the VFS 122. The request includes a path for the file.

At 220, the VFS 122 determines whether the file has been opened successfully at the client 120. If the file has been opened successfully at the client 120, the VFS 122 returns information about the file to the application 124 at 230. The information about the file may include, for example, an attribute of the file, an offset address of the file on the backup server 110, and so on. On the other hand, if it is determined at 220 that the file fails to be opened at the client 120 (i.e., it is determined that the file has not been opened successfully at the client 120), the VFS 122 searches a first cache of the VFS 122 for the path for the file at 240. The first cache is configured to store paths for files that fail to be opened at the client 120. It would be appreciated that failure in opening a file at the client 120 means that the file does not exist on the backup server 110, or the file exists on the backup server 110 but the application 124 has no right to open the file. Hereinafter, a file that fails to be opened at the client 120 is also referred to as "an invalid file."

At 250, the VFS 122 determines whether the path is found in the first cache. If the VFS 122 determines that the path is found in the first cache, the VFS 122 returns an indication of failure in opening the file to the application 124.

Since the first cache is used in VFS for storing paths for files that fail to be opened at the client, the embodiments of the present disclosure can search the first cache for a path for a file upon receiving a request for opening the file. If the path for the file is found in the first cache, the VFS directly returns an indication of failure in opening the file to the application, without a need of establishing a connection with the backup server for performing search in the backup server. Therefore, it saves time for establishing network communications between the client and the backup server and time for searching files in the backup server.

Continuing to refer to FIG. 2, if the VFS 122 determines at 250 that the path for the file is not found in the first cache, any appropriate act is performed at 270. In some embodiments, if the VFS 122 determines at 250 that the path for the file is not found in the first cache, the VFS 122 may perform the method 300 as shown in FIG. 3.

Figure 3:
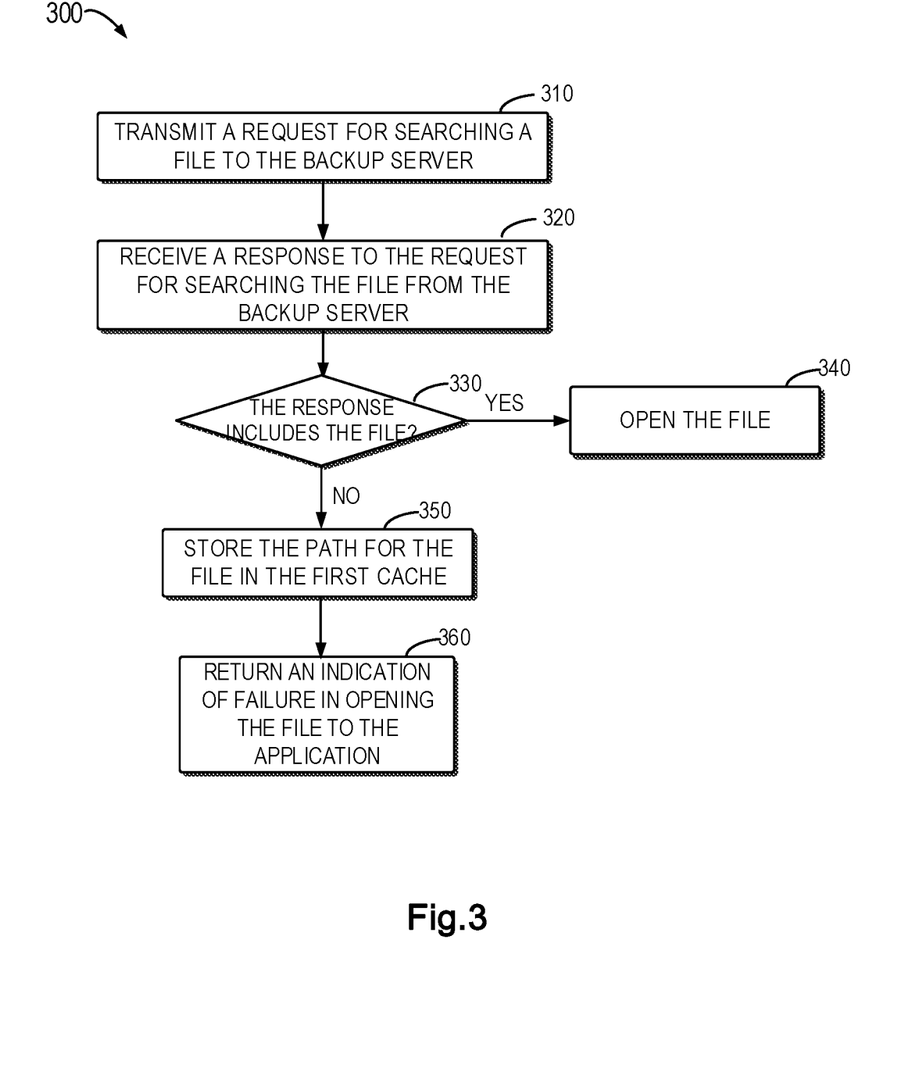
FIG. 3 illustrates a flowchart of a method of accessing a file according to some other embodiments of the present disclosure.

FIG. 3 illustrates a flowchart of a method 300 for accessing a file according to some other embodiments of the present disclosure. It would be appreciated that the method 300 may be performed by the client 120 as described above with reference to FIG. 1. Moreover, the method 300 may be an example implementation of the act 270 as described above with reference to FIG. 2.

At 310, the VFS 122 transmits, to the backup server 110, a request for searching a file requested to be opened.

At 320, the VFS 122 receives, from the backup server 110, a response to the request for searching the file.

At 330, the VFS 122 determines whether the response includes the file requested to be opened. If the response includes the file requested to be opened, the VFS 122 opens the file at 340. On the other hand, if the response does not include the file requested to be opened but includes an indication of failure in finding the file, the VFS 122 stores the path for the file in the first cache at 350.

At 360, the VFS 122 returns, to the application 124, an indication of failure in opening the file.

According to embodiments of the present disclosure, only if a path for a file requested to be opened is not found in first cache, the client establishes a connection with the backup server to perform searching in the backup server. If the file is not found on the backup server, the path for the file is stored in the first cache. As a result, in a case of receiving a subsequent request for opening the file, if the path is found in the first cache, an indication of failure in opening the file may be returned to the application, without a need of searching the backup server for the file repeatedly. Thereupon, it saves time for establishing network communications between the client and the backup server and time for searching the backup server for the file. Table 1 illustrates comparison of performances of the legacy solution and embodiments of the present disclosure in terms of file searching time.

TABLE 1

|  | Legacy solution | | Embodiments of the present disclosure | |
|---|---|---|---|---|
|  | Number of requests for opening files | Time | Number of requests for opening files | Time |
| Pre-recovery in a Windows Volume Shadow Copy-Service (VSS) writer | 6412 | 466 sec | 5830 | 16 sec |
| Recovering files | 33 | 60 sec | 29 | 60 sec |
| Post-recovery in VSS writer | 2386 | 457 sec | 1904 | 117 sec |
| Whole GLR procedure | | 2216 sec | | 812 sec |

In the legacy solution, for a file that has been not opened successfully at the client, the VFS transmits a request for searching the file directly to the backup server. If an indication of failure in finding the file is received from the backup server, the VFS returns the indication of failure in opening the file to the application. In the embodiments of the present disclosure, upon receiving a request for opening the file, the VFS searches the first cache for the path for the file. If the path for the file is found in the first cache, the VFS directly returns an indication of failure in opening the file to the application, without a need of establishing a connection with the backup server to perform searching on the backup server.

As seen from Table 1, the number of requests for opening files that are received in the legacy solution is close to the number of request for opening files that are received in the embodiments of the present disclosure. However, in the case of using the embodiments of the present disclosure, time for data recovery is reduced by about 36.6%. Hence, by means of the performance of the optimized VFS according to the embodiments of the present disclosure, the time for data recovery is reduced, and the data recovery performance of the data protection system is improved.

In some embodiments, the VFS 122 may determine whether a file has been successfully opened at the client 120 by the following: searching the second cache of the VFS 122 for the path for the file; and determining that the file fails to be opened if the path for the file is not found in the second cache. The second cache is configured to store paths for files that have been opened successfully at the client 120. In some embodiments, the second cache is configured with a storage space different from the first cache. In some embodiments, the second cache is also configured to store information about the file, such as an attribute of the file, an offset address of the file on the backup server 110, and the like.

Figure 4A:
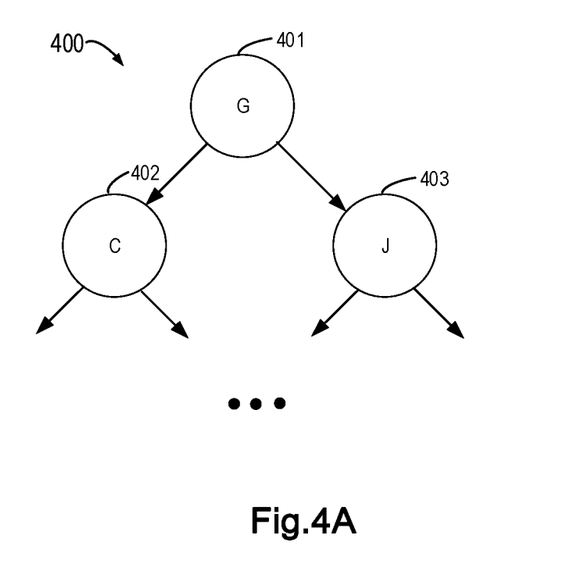
FIG. 4A illustrates a tree structure for representing paths of files according to some embodiments of the present disclosure.

In some embodiments, a tree structure is used to represent logical relationship between paths for files that fail to be opened. FIG. 4A illustrates a red-black tree structure 400 representing logical relationship between paths for files according to some embodiments of the present disclosure. As shown, the red-black tree structure 400 includes a root node 401 and child nodes 402, 403 of the root node 401. For the purpose of illustration, FIG. 4A only shows two layers of the red-black tree structure 400, and skips additional nodes at a lower layer.

Each node in the red-black tree structure 400 represents a path for a file that fails to be opened at the client 120, and a key value of the node is a file path string. For example, the node 402 represents a path for a file failing to be opened at the client 120, namely "C:\desktop.ini". Likewise, the nodes 401 and 403 represent paths for files failing to be opened at the client 120 initiated with alphabets "G" and "J", respectively.

Figure 4B:
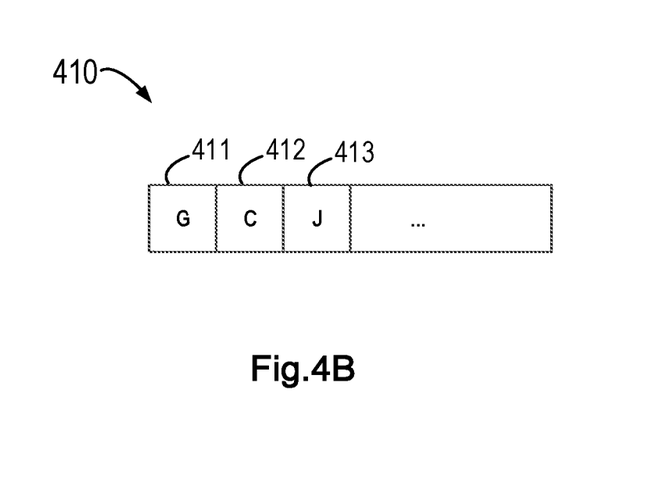
FIG. 4B illustrates a queue for storing paths of files according to some embodiments of the present disclosure.

In some embodiments, a queue is used to store key values of nodes in the red-black tree structure 400. FIG. 4B illustrates a queue 410 for storing paths for files. The queue 410 includes elements 411, 412 and 413 for storing paths represented by nodes 401, 402 and 403 in FIG. 4A, respectively. For example, the element 412 stores the path "C:\desktop.ini" represented by the node 402. Likewise, the elements 411 and 413 store paths represented by the nodes 401 and 403 and initiated with "G" and "J", respectively.

In some embodiments, a threshold number of elements in the queue 410 is predetermined. In some embodiments, an order of elements in the queue 410 is an order of inserting paths for files into the red-black tree structure 400.

In some embodiments, the first cache stores time at which a file fails to be opened at the client 120. In some embodiments, the first cache stores an indication of the time. For example, in an embodiment for using a queue to store paths for files, an index of an element of the queue for storing a path for a file indicates time at which the file fails to be opened at the client 120. It would be appreciated that a smaller index value of an element of the queue corresponds to earlier time at which the file fails to be opened at the client 120, which is indicated by the path stored in the element of the queue. For example, in the example of FIG. 4B, the time at which the file fails to be opened indicated by the path stored in the element 411 is earlier than that indicated by the path stored in the element 412.

In some embodiments, a threshold for the number of paths for files in the first cache is predetermined. In an embodiment of using a queue to store paths for files, the threshold is equal to the threshold for the number of elements in the queue. In some embodiments, the threshold is in a range from 500 to 3000. It would be appreciated that the threshold may be any appropriate value, and the scope of the present disclosure is not limited in the aspect.

In some embodiments, storing the paths for files in the first cache includes: comparing the number of the paths for the files in the first cache with a threshold number; in response to the number of the paths exceeding the threshold number, determining a path for a first file that is least recently accessed in the files in the first cache; and removing the determined path for the first file from the first cache. In some embodiments, a Least Recently Used (LRU) algorithm may be used to determine the path for the first file that is least recently accessed in the first cache.

It would be appreciated that, in the case where the number of paths in the first cache exceeds the threshold, if a path for a file frequently requested to be opened is removed from the first cache, the VFS 122 has to transmit a request for searching the file to the backup server 110 upon receiving a subsequent request for opening the file. This will incur waste of time and resources of the backup server 110. In some embodiments, in order to prevent a path for a file frequently requested to be opened from the first cache, if the VFS 122 finds the path for the file in the first cache (which means that the file is previously requested to be opened at the client 120), the VFS 122 updates the time at which the file fails to be opened at the client 120. In the embodiment of using a queue to store paths for files, the time at which the file fails to be opened at the client 120 is updated by removing the element for storing the found path to the end of the queue.

Figure 5:
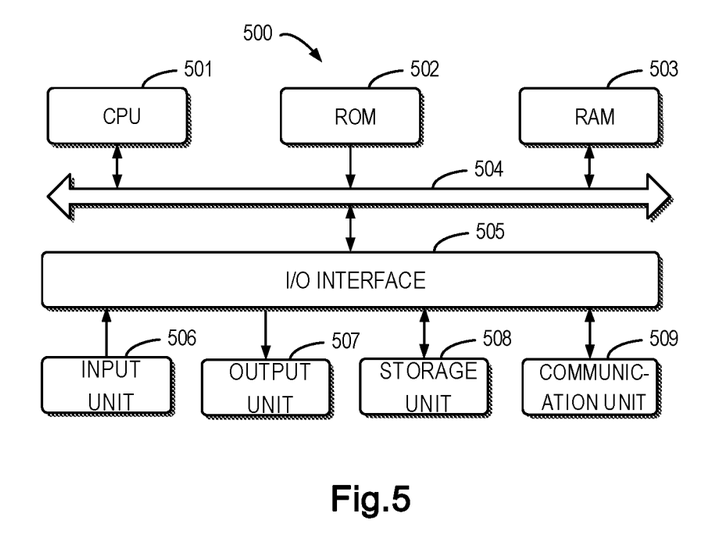
FIG. 5 illustrates a block diagram of a device that can be used to implement the embodiments of the present disclosure.

FIG. 5 illustrates a block diagram of an example device 500 that may be used to implement the embodiments of the present disclosure. As shown, the device 500 includes a central processing unit (CPU) 501 which performs various appropriate actions and processing, based on a computer program instruction stored in a read-only memory (ROM) 502 or a computer program instruction loaded from a storage unit 508 to a random access memory (RAM) 503. The RAM 503 stores therein various programs and data required for operations of the device 500. The CPU 501, the ROM 502 and the RAM 503 are connected via a bus 504 with one another. An input/output (I/O) interface 505 is also connected to the bus 504.

The following components in the device 500 are connected to the I/O interface 505: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the device 500 to exchange information/data with other devices through a computer network such as the Internet and/or various kinds of telecommunications networks.

Various processes and processing described above, e.g., the methods 200 and 300, may be performed by the processing unit 501. For example, in some embodiments, the methods 200 and 300 may be implemented as a computer software program that is tangibly included in a machine readable medium, e.g., the storage unit 508. In some embodiments, part or all of the computer programs may be loaded and/or mounted onto the device 500 via ROM 502 and/or communication unit 509. When the computer program is loaded to the RAM 503 and executed by the CPU 501, one or more steps of the methods 200 and 300 as described above may be performed.

As used herein, the term "includes" and its variants are to be read as open terms that mean "includes, but is not limited to." The term "based on" is to be read as "based at least in part on." The term "one embodiment" and "the embodiment" are to be read as "at least one embodiment." The terms "first," "second," and the like may refer to different or same objects. Other definitions, explicit and implicit, may be included in the context.

As used herein, the term "determining" covers various acts. For example, "determining" may include operation, calculation, process, derivation, investigation, search (for example, a search through a table, a database or a further data structure), identification and the like. In addition, "determining" may include receiving (for example, receiving information), accessing (for example, accessing data in the memory) and the like. Further, "determining" may include resolving, selecting, choosing, establishing and the like.

It will be noted that the embodiments of the present disclosure can be implemented in software, hardware, or a combination thereof. The hardware part can be implemented by a special logic; the software part can be stored in a memory and executed by a suitable instruction execution system such as a microprocessor or special purpose hardware. Those skilled in the art would appreciate that the above apparatus and method may be implemented with computer executable instructions and/or in processor-controlled code, and for example, such code is provided on a carrier medium such as a programmable memory or an optical or electronic signal bearer.

Further, although operations of the method according to the present disclosure are described in a particular order in the drawings, it does not require or imply that these operations are necessarily performed according to this particular sequence, or a desired outcome can only be achieved by performing all shown operations. On the contrary, the execution order for the steps as depicted in the flowcharts may be varied. Alternatively, or in addition, some steps may be omitted, a plurality of steps may be merged into one step, or a step may be divided into a plurality of steps for execution. It will also be noted that the features and functions of two or more units of the present disclosure may be embodied in one apparatus. In turn, the features and functions of one unit described above may be further embodied in more units.

Although the present disclosure has been described with reference to various embodiments, it should be understood that the present disclosure is not limited to the disclosed embodiments. The present disclosure is intended to cover various modifications and equivalent arrangements included in the spirit and scope of the appended claims.

We claim:

1. A method of accessing a file, comprising:
receiving, in a virtual file system on a client, a request for opening a file in the virtual file system from an application, the request comprising a path for the file;
in response to determining that the file has been opened successfully at the client, returning information about the file to the application;
in response to determining that the file fails to be opened successfully at the client, searching a first cache of the virtual file system for the path, the first cache being configured to store paths for files that fail to be opened at the client;
in response to success in finding the path in the first cache, returning an indication of failure in opening the file to the application; and
in response to failure in finding the path in the first cache, transmitting a request for searching for the file to a backup server.

2. The method of claim 1, further comprising:
in response to receiving an indication of failure in finding the file from the backup server, storing the path for the file in the first cache and returning the indication of the failure in opening the file to the application; and
in response to receiving an indication of success in finding the file from the backup server, opening the file from the backup server.

3. The method of claim 2, further comprising:
storing, in the first cache, a time at which the file fails to be opened at the client.

4. The method of claim 3, further comprising:
in response to success in finding the path for the file in the first cache, updating the time for the file.

5. The method of claim 3, wherein storing the path in the first cache comprises:
comparing a number of the paths for the files in the first cache with a threshold number;
determining that the number of the paths for the files in the first cache exceeds the threshold number;
determining a path for a first file that is least recently used in the files in the first cache; and
removing the determined path for the first file from the first cache.

6. The method of claim 1, wherein determining that the file fails to be opened successfully at the client comprises:
searching a second cache of the virtual file system for the path, the second cache being configured to store paths for files that have been opened successfully at the client; and
in response to failure in finding the path for the file in the second cache, determining that the file fails to be opened successfully.

7. An electronic device, comprising:
at least one processor; and
at least one memory coupled to the at least one processor to store instructions, which when executed by the at least one processor, cause the at least one processor to perform operations, the operations including:
receiving, in a virtual file system on a client, a request for opening a file in the virtual file system from an application, the request comprising a path for the file;
in response to determining that the file has been opened successfully at the client, returning information about the file to the application;
in response to determining that the file fails to be opened successfully at the client, searching a first cache of the virtual file system for the path, the first cache being configured to store paths for files that fail to be opened at the client;
in response to success in finding the path in the first cache, returning an indication of failure in opening the file to the application; and
in response to failure in finding the path in the first cache, transmitting a request for searching for the file to a backup server.

8. The electronic device of claim 7, wherein the operations further comprise:
in response to receiving an indication of failure in finding the file from the backup server, storing the path for the file in the first cache and returning the indication of the failure in opening the file to the application; and
in response to receiving an indication of success in finding the file from the backup server, opening the file from the backup server.

9. The electronic device of claim 8, wherein the operations further comprise:
storing, in the first cache, a time at which the file fails to be opened at the client.

10. The electronic device of claim 9, wherein the operations further comprise:
in response to success in finding the path for the file in the first cache, updating the time for the file.

11. The electronic device of claim 9, wherein the operations further comprise:
comparing a number of the paths for the files in the first cache with a threshold number;
determining that the number of the paths for the files in the first cache exceeds the threshold number;
determining a path for a first file that is least recently used in the files in the first cache; and
removing the determined path for the first file from the first cache.

12. The electronic device of claim 7, wherein determining that the file fails to be opened successfully at the client comprises:
  searching a second cache of the virtual file system for the path, the second cache being configured to store paths for files that have been opened successfully at the client; and
  in response to failure in finding the path for the file in the second cache, determining that the file fails to be opened successfully.

13. A non-transitory computer readable medium having instructions stored therein, which when executed by a processor, causing the processor to perform operations, the operations comprising:
  receiving, in a virtual file system on a client, a request for opening a file in the virtual file system from an application, the request comprising a path for the file;
  in response to determining that the file has been opened successfully at the client, returning information about the file to the application;
  in response to determining that the file fails to be opened successfully at the client, searching a first cache of the virtual file system for the path, the first cache being configured to store paths for files that fail to be opened at the client;
  in response to success in finding the path in the first cache, returning an indication of failure in opening the file to the application; and
  in response to failure in finding the path in the first cache, transmitting a request for searching for the file to a backup server.

14. The computer readable medium of claim 13, wherein the operations further comprise:
  in response to receiving an indication of failure in finding the file from the backup server, storing the path for the file in the first cache and returning the indication of the failure in opening the file to the application; and
  in response to receiving an indication of success in finding the file from the backup server, opening the file from the backup server.

15. The computer readable medium of claim 14, wherein the operations further comprise:
  storing, in the first cache, a time at which the file fails to be opened at the client.

16. The computer readable medium of claim 15, wherein the operations further comprise:
  in response to success in finding the path for the file in the first cache, updating the time for the file.

17. The computer readable medium of claim 15, wherein storing the path in the first cache comprises:
  comparing a number of the paths for the files in the first cache with a threshold number;
  determining that the number of the paths for the files in the first cache exceeds the threshold number;
  determining a path for a first file that is least recently used in the files in the first cache; and
  removing the determined path for the first file from the first cache.

18. The computer readable medium of claim 13, wherein determining that the file fails to be opened successfully at the client comprises:
  searching a second cache of the virtual file system for the path, the second cache being configured to store paths for files that have been opened successfully at the client; and
  in response to failure in finding the path for the file in the second cache, determining that the file fails to be opened successfully.

* * * * *